April 27, 1965 D. L. McCABE 3,180,678
THERAPEUTIC OR WALKING EXERCISING VEHICLE
Filed May 14, 1962 2 Sheets-Sheet 1
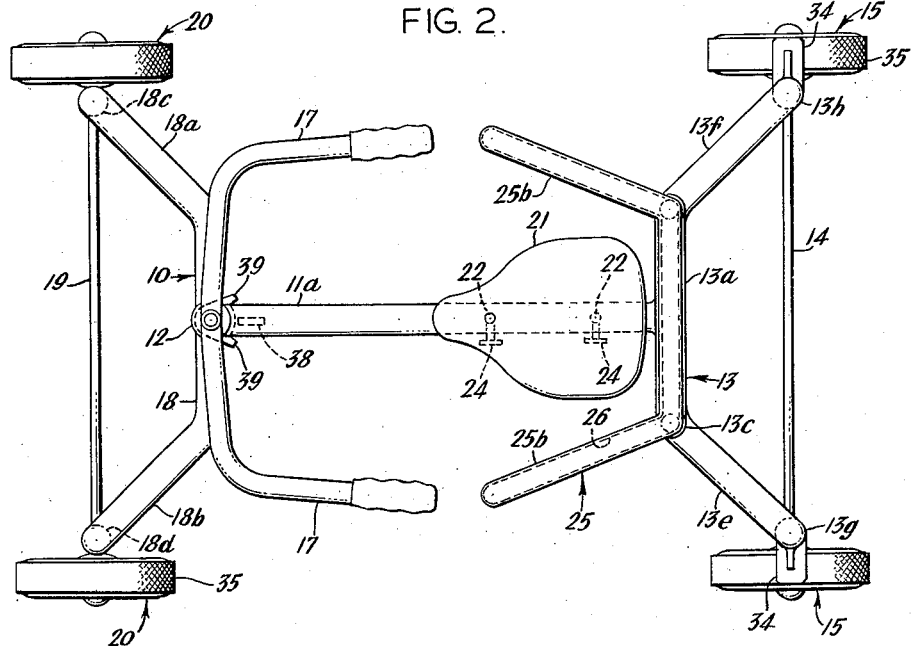
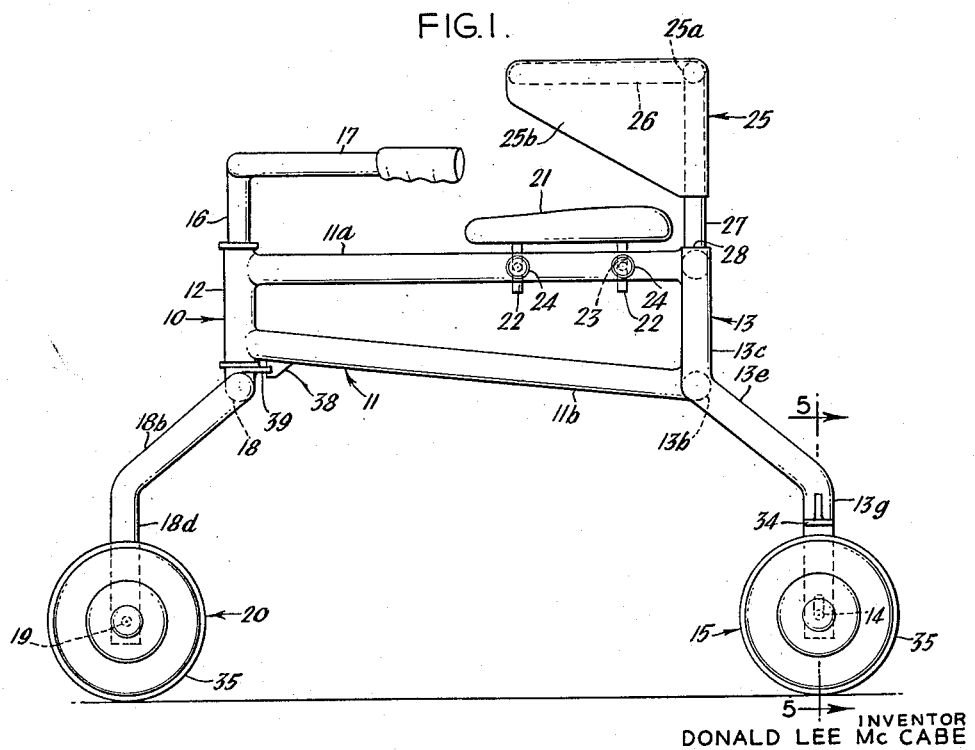
INVENTOR
DONALD LEE McCABE
BY *Howson & Howson*
ATTYS.

April 27, 1965     D. L. McCABE     3,180,678
THERAPEUTIC OR WALKING EXERCISING VEHICLE
Filed May 14, 1962     2 Sheets-Sheet 2
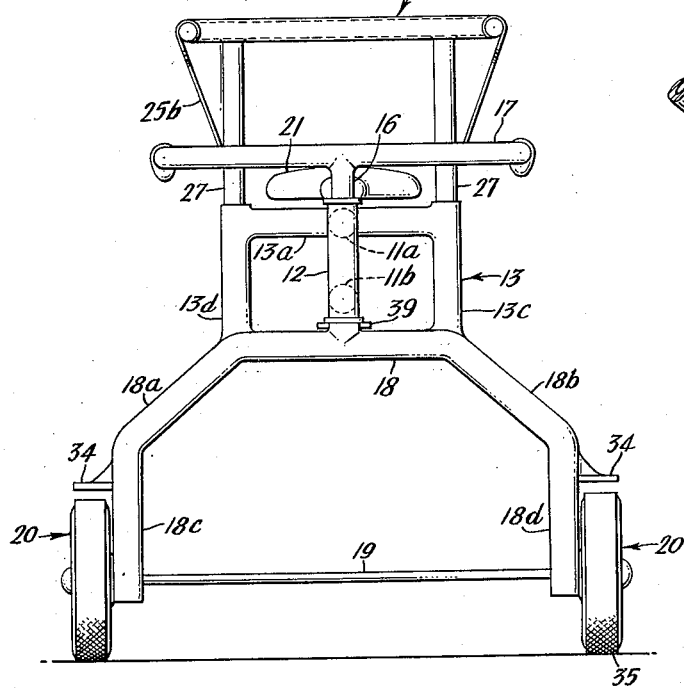
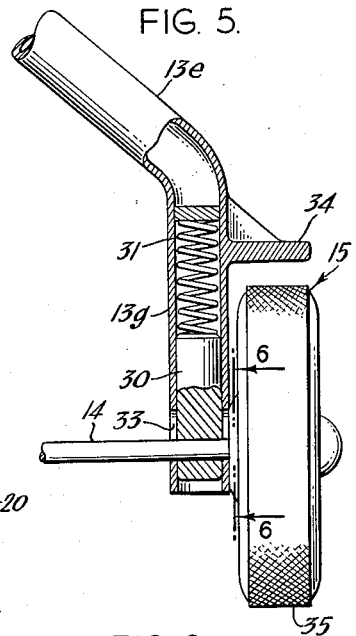
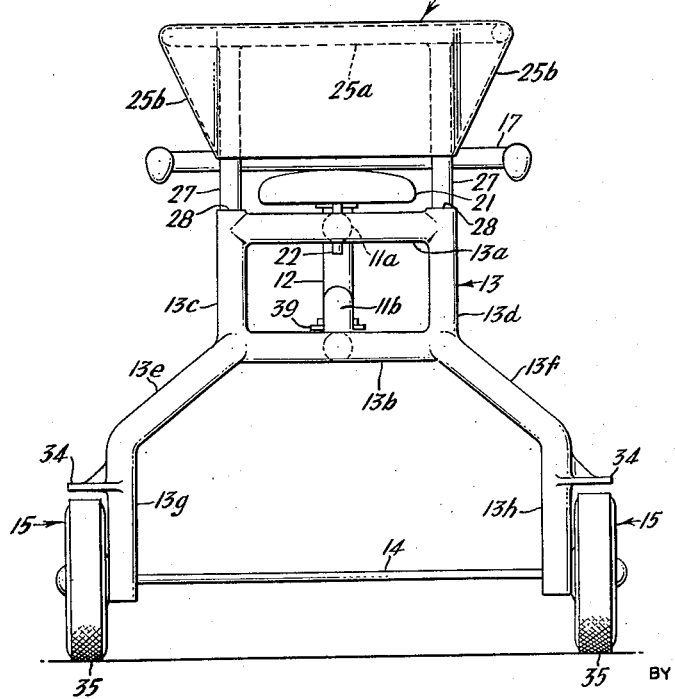
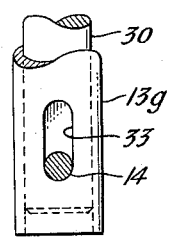
INVENTOR
DONALD LEE McCABE
BY Howson & Howson
ATTYS.

United States Patent Office 3,180,678
Patented Apr. 27, 1965

3,180,678
THERAPEUTIC OR WALKING EXERCISING
VEHICLE
Donald Lee McCabe, 925 S. Main St., Towanda, Pa.
Filed May 14, 1962, Ser. No. 194,570
2 Claims. (Cl. 297—5)

This invention relates to a therapeutic exercising vehicle, especially such a vehicle which is suited for walking exercises of post-operative patients, and has for an object the provision of improvements in this art.

One of the particular objects of the invention is to provide a vehicle of the character described which has a broad base and related features which provide great stability and safety so as to obviate accidents to patients using it.

Another object is to provide a vehicle which is braked when the user sits down, thus assuring that the user walks instead of rides and also assuring that the vehicle remains stationary when the user sits on it. This aids in moving down ramps and the like.

Another object is to provide a vehicle which has a body-embracing back rest to assure that the user does not fall out on the side or back.

Another object is to provide a body-embracing back rest which is readily removable to permit the user to be seated safely.

Another object is to provide a vehicle which has means for limiting the turning angle of the front wheels thus assuring that a broad base of support will be maintained at all times.

Another object is to provide a vehicle which has a low center of gravity for sitting, the stability being increased by adding weight to the frame adjacent the wheels.

The above and other objects as well as certain features and advantages of the invention will be apparent from the following description of an exemplary embodiment, reference being made to the accompanying drawings, wherein:

FIG. 1 is a side elevation of a vehicle embodying the invention;
FIG. 2 is a plan view;
FIG. 3 is a front elevation;
FIG. 4 is a rear elevation;
FIG. 5 is an enlarged fragmentary section taken on the line 5—5 of FIG. 1; and
FIG. 6 is a section taken on the line 6—6 of FIG. 5.

As shown in the drawings, the vehicle or walking aid comprises a frame 10 which includes a longitudinal portion 11 formed as two vertically spaced bars 11a, 11b connected at the front end to a vertical steering post 12 and connected at the rear end to two transverse horizontal bars 13a, 13b which form part of a rear frame unit 13.

The transverse bars 13a, 13b of the rear frame unit are connected at the ends to vertical tubular bars 13c, 13d which at the lower ends are bent outward in the inclined portions 13e, 13f which at their lower ends are bent down vertically into the portions 13g, 13h to provide anchorage for the axle 14 of rear wheels 15. The frame is preferably formed of steel tubing welded together at the joints.

The steering post 12 turnably carries a steering column 16 provided with handle bars 17 which are adjustable in height and at the lower end is provided with a transverse horizontal bar 18 which on the sides is bent down in the inclined portions 18a, 18b which at their lower ends are bent down vertically into the portions 18c, 18d which carry the axle 19 of front wheels 20.

A seat 21 is mounted on vertical posts or stems 22 which slide for vertical adjustment in guides or sockets 23 provided on the horizontal frame bar 11a and held in adjusted position by hand-operated set screws 24.

A U-shaped back rest 25, including a transverse panel or back rest proper 25a and side panels or wings 25b, is mounted on a horizontal U-shaped back frame member 26 which carries vertical posts 27 on the sides, the posts 27 being insertable in guides or sockets 28 formed by the frame portions 13c, 13d. This arrangement provides side as well as back support for the user and permits him to easily remove the back when getting on or off the vehicle.

Means are provided for braking the vehicle at the rear wheels and, if desired, at the front wheels also when the user sits down. As shown, the vertical portions 13g, 13h have slidably mounted therein a piston 30 backed by a compression spring 31 and retained by the axle 14 carried in a slot 33 in the frame tube. The pistons 30 carry the wheel axle 14. The frame portions 13g, 13h on the side carry lateral brake bar elements 34 which engage the tires 35 of the wheels when weight is placed on the seat of the vehicle. The pistons 30 may be formed of solid heavy material to add weight near the axle.

Means are provided for limiting the angle of turning of the front wheels, the means here including a stop 38 carried by the frame bar 11b on its lower side and projections 39 carried by the steering column 16. The stops are here located where they will be out of the way of any part of the user's body or clothing. A full enclosure may be provided for the angle limiting means if desired.

It is thus seen that the vehicle combines features in an advantageous manner to make it simple, strong, controllable, safe and convenient for the patient who uses it.

While one embodiment of the invention has been described for purposes of illustration it is to be understood that there may be various embodiments within the scope of the invention.

I claim:
1. A walking exercising vehicle comprising in combination, a frame including upper and lower medial longitudinal bars, a seat adjustably mounted on longitudinally spaced sockets on said upper bar, a steering post secured to the front end of said longitudinal bars, a steering column turnably mounted in said steering post, laterally spaced wheels carried by said steering column, stops between said steering column and the lower end of said steering column for limiting to a small arc the turning movement of said steering column, upper and lower transverse rear frame members secured to the rear ends of said longitudinal bars, vertical members secured to the ends of said transverse members, said vertical members providing back rest sockets, a back rest having laterally spaced posts fitting in said sockets, forwardly extending panels on the sides of said back rest adapted to embrace the body of the user, lower frame parts below said vertical members, wheels mounted on said lower frame parts, the wheel mounting including a piston movable in a vertical guide with retaining means and a spring between the piston and lower frame part, and a lateral projection on said lower frame part adapted to engage the wheel and brake it when the user puts weight on the frame.

2. A walking exercising vehicle, comprising in combination, a frame including a longitudinal portion, a steering post portion in front and a rear frame portion in the rear, a steering column turnably mounted in the steering post, laterally spaced wheels carried by said steering column, said rear frame including a transverse portion and laterally spaced downwardly extending portions secured on the ends of the transverse portion, laterally spaced wheels carried by said downwardly extending portions, a seat carried by said longitudinal portion, a back support carried by said rear frame portion, an axle carrying said wheels, slide members carrying said axle, each slide being mounted for limited vertical movement in a downwardly extending portion of the rear frame, a spring urging said slide downward and the frame upwardly but yieldable to allow the frame to move down when an occupant sits on the seat, and brake means between said frame and wheels which is applied when the occupant sits on the seat, whereby to require him to stand and walk in order to travel on the vehicle, said slides being heavy weights to provide a low center of gravity for the vehicle to stabilize it against being overturned by the occupant.

References Cited by the Examiner

UNITED STATES PATENTS

| | | | |
|---|---|---|---|
| 1,392,834 | 10/21 | Kramlich | 280—87 |
| 1,432,612 | 10/22 | O'Connor | 280—87 |
| 1,464,465 | 8/23 | Baechle | 188—109 |
| 1,471,749 | 10/23 | Monroe | 297—5 X |
| 1,522,299 | 1/25 | Hampton | 188—42 |
| 1,561,264 | 11/25 | Mayer | 280—87.02 |
| 2,214,176 | 9/40 | Portle | 188—74 |
| 2,334,387 | 11/43 | Curty | 280—87 X |
| 2,387,159 | 10/45 | Lee | 280—92 |
| 2,792,874 | 5/57 | Sundberg | 297—5 X |
| 2,869,686 | 1/59 | Glanz | 188—109 |
| 2,942,698 | 6/60 | Balinger | 188—29 |

ARTHUR L. LA POINT, *Primary Examiner.*

A. JOSEPH GOLDBERG, EUGENE G. BOTZ,
*Examiners.*